July 31, 1962 — A. L. LEE ETAL — 3,047,115
FLUID OPERATED CLUTCH
Filed June 29, 1960 — 2 Sheets-Sheet 1
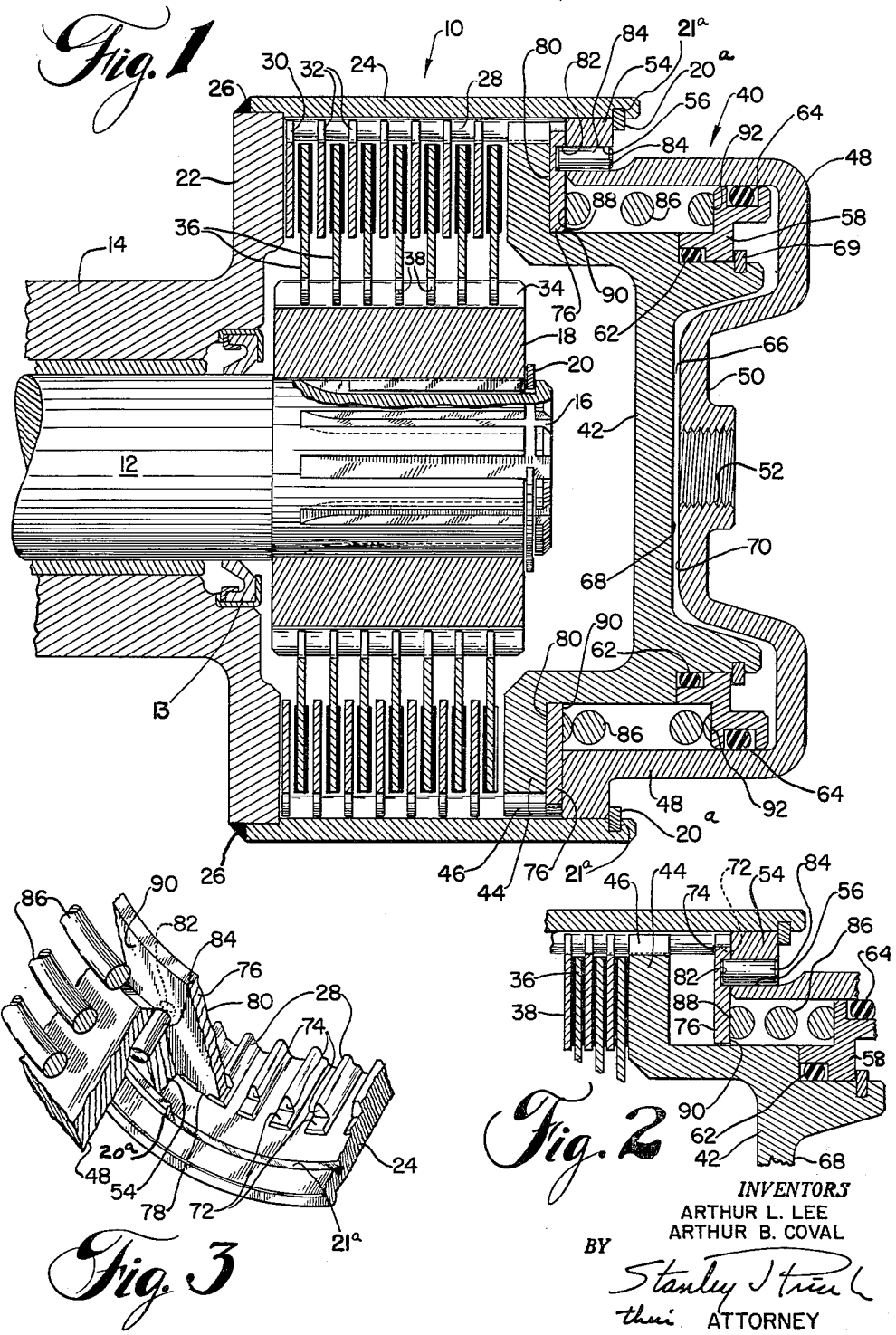
INVENTORS
ARTHUR L. LEE
ARTHUR B. COVAL
BY Stanley J. Prim
their ATTORNEY July 31, 1962 A. L. LEE ETAL 3,047,115

FLUID OPERATED CLUTCH

Filed June 29, 1960 2 Sheets-Sheet 2

INVENTORS
ARTHUR L. LEE
ARTHUR B. COVAL
BY Stanley J Price
their ATTORNEY

United States Patent Office 3,047,115
Patented July 31, 1962

3,047,115
FLUID OPERATED CLUTCH
Arthur L. Lee and Arthur B. Coval, Columbus, Ohio, assignors to Consolidation Coal Company, Pittsburgh, Pa., a corporation of Pennsylvania
Filed June 29, 1960, Ser. No. 39,587
8 Claims. (Cl. 192—85)

This invention relates to a fluid actuated clutch and more particularly to a fluid actuated disc type clutch in which any fluid under pressure may be applied to a piston type actuating element of the clutch.

This application is a continuation-in-part of our co-pending U.S. patent application Serial No. 641,382 filed February 20, 1957, now abandoned.

Fluid operated disc type clutches have certain limitations, which in the past have tended to limit their use. The most prominent of these limitations is the relatively large external dimensions required to provide adequate friction surfaces for a given clutch torque. This is particularly true when a conventional piston type actuating element is employed. In the past, it has been the practice with the conventional piston type actuating element to use a plurality of external coil type springs to return the piston to the disengaged position upon release of fluid pressure. These piston return springs have proved instrumental in increasing the external dimension of the clutch and increased the time required to disassemble the clutch to replace worn friction discs positioned within the clutch housing.

It is believed the plurality of external springs is also a factor that contributes to erratic clutch operation due to uneven wear of the friction surfaces. It is difficult without special equipment to adjust the compression of each of the external springs so that their compression is equal and an equal force will be exerted around the entire annular surface of the clutch discs. Any unequal force will result in certain segments of the clutch plates engaging first and absorbing the wear of the initial high frictional resistance.

In the past the above problems were minimized by increasing the friction surface area to compensate for the uneven wear of the clutch discs. This resulted in clutches having a greater external dimension than was necessary for a given torque.

We have discovered with our new "power package" having a single return spring positioned within the cylinder, that it is now possible, for a given torque, to employ clutches of smaller external dimension and still maintain substantially the same rate of wear on the clutch discs. In addition our new "power package" is easily removable as a single unit from the clutch housing so that the clutch discs are readily accessible for quick replacement or repair.

In some clutch applications we have found that the interleaved friction discs sometime tend to wedge or stick in the engaged or partially engaged position after the actuating fluid has been vented from the clutch, resulting in clutch drag which can cause premature friction disc wear and inefficient operation of the mechanism controlled by the clutch. In these applications, we have found it useful to provide a friction disc return spring in our clutch. This return spring serves to positively move the friction discs upon disengagement of the clutch so that the clutch friction discs are free to reposition themselves at spaced intervals within the clutch housing.

We have also found that, under certain circumstances of clutch use, it is desirable to provide a wet disc clutch construction to cool the clutch structure and prevent excessive wear. By wet disc clutch is meant a disc clutch in which lubricating liquid such as light oil or the like is circulated throughout the clutch housing and among the clutch friction discs. The present invention contemplates an improved wet disc clutch structure with a simple and efficient lubricating liquid circulation system.

With the foregoing considerations in mind, it is a principal object of the present invention to provide an improved fluid actuated disc type clutch.

Another object of this invention is to provide a fluid operated clutch having a "power package" which may be easily and quickly disassembled from the clutch housing to facilitate speedy and simple replacement of the friction discs.

A further object of this invention is to provide a fluid operated clutch which contains a single piston return spring within the clutch housing.

A still further object of this invention is to provide a fluid operated clutch having a novel back-up plate construction adapted to be arranged within the clutch housing.

Another object of this invention is to provide a fluid operated clutch having a friction disc return spring to prevent clutch drag when the clutch is disengaged.

Another object of this invention is to provide an improved fluid operated wet disc clutch having a simple and efficient lubricating and cooling system.

Another object of this invention is to provide a fluid operated clutch which has a relatively small number of parts which are easily assembled and disassembled and yet provides large working torques for relatively small external clutch dimensions.

These and other objects will become apparent throughout the specification and claims as hereinafter related.

FIGURE 1 is a view through a part of a transmission showing the fluid operated clutch in relation to the driving or driven members of the transmission.

FIGURE 2 is a fragmentary sectional view similar to FIGURE 1 illustrating the axial movement of the clutch piston with the back-up plate functioning to compress the return spring.

FIGURE 3 is a fragmentary perspective view illustrating the geared construction of the clutch housing which is adapted to receive the friction discs actuator piston and the return spring back-up plate.

Figure 4:
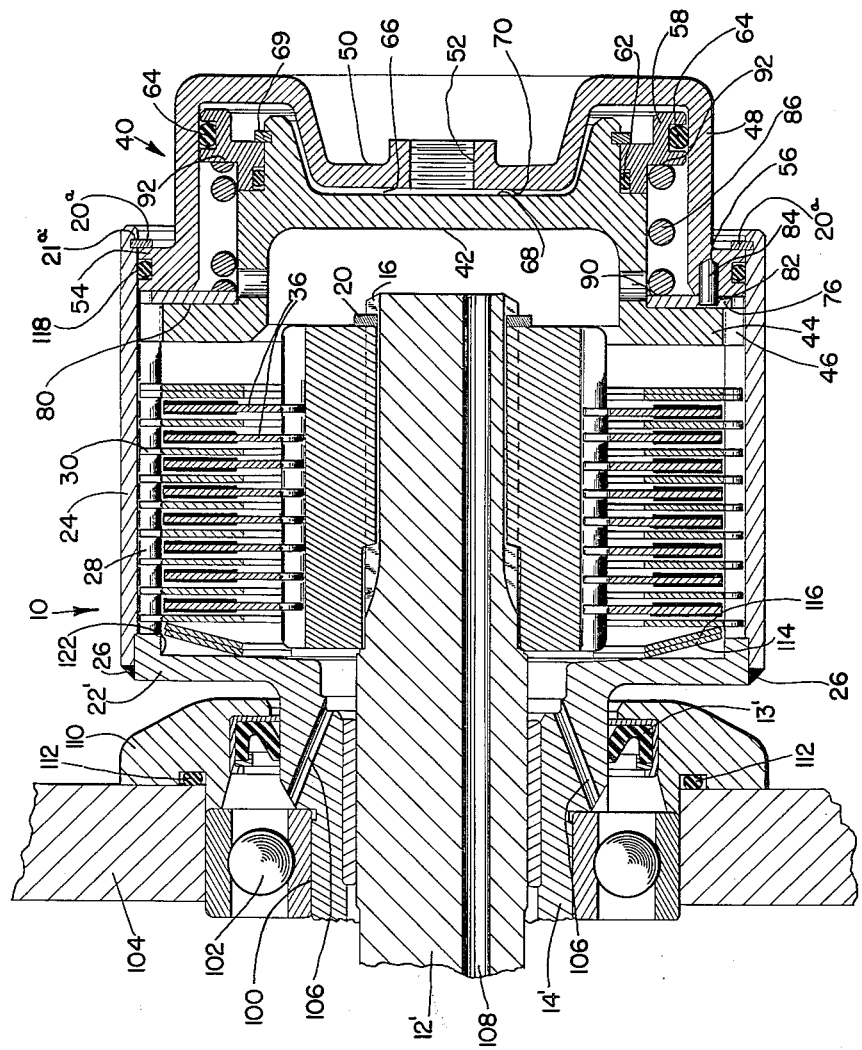
FIGURE 4 is a view similar to FIGURE 1 showing a wet disc clutch having a friction disc return spring which is a modified embodiment of the clutch shown in FIGURE 1.

Referring to the drawings and particularly to FIGURE 1 there is illustrated a clutch generally indicated by the numeral 10 operatively connected to the transmission driving and driven elements 12 and 14. A fluid seal 13 is disposed between the transmission elements 12 and 14 to prevent passage of fluid from the transmission into the clutch 10. The driving element 12 is a drive shaft having a splined end portion 16. A clutch hub 18 is secured to the shaft splined end portion 16 by means of a snap ring 20. The driven member 14 is a tubular shaft axially aligned with the driving shaft 12. The driven shaft 14 has an outwardly flanged end portion 22 which is secured to a cylindrical clutch housing 24 by means of a weld 26. Thus, when the driving element 12 rotates, the clutch hub 18 rotates therewith, and similarly when the clutch housing 24 rotates, the driven element 14 rotates therewith.

The clutch housing 24 has an internal splined portion 28 operable to receive steel friction plates 30 having an external splined portion 32 which meshes with the clutch housing internal splined portion 28 so that the steel friction plates 30 rotate with the clutch housing 24. That is, the steel friction plates 30 are nonrotatably secured to the clutch housing 24 but are movable axially relative thereto.

Similarly the clutch hub 18 has an external splined portion 34 which meshes with the internal splined portion 38 of bronze friction plates 36 so that the bronze friction plates 36 are nonrotatably secured to the clutch hub 18 but are axially movable relative thereto. When assembled, the bronze friction plates 36 are interleaved between the steel friction plates 30 to provide a frictional surface on both sides of each plate. Thus when the friction plates 30 and 36 are axially compressed against each other, and against the wall of the end portion 22 which may be called an abutment member, there is a substantially direction connection between the driving element 12 and the driven element 14.

Although elements 12 and 14 are designated as driving and driven elements, it should be understood that element 14 may equally serve as a driving element and element 12 serve as the driven element. Also, the clutch plates 30 and 36 are designated as steel and bronze clutch plates respectively for illustrative purposes only. It should be understood that it is within the scope of this invention to include clutch plates constructed from any conventional friction material.

The "power package" generally designated by the numeral 40 is operable to move the friction plates axially to frictionally engage the steel friction plates 30 to the bronze friction plates 36 for transmission of rotative movement therethrough. The "power package" 40 includes a clutch piston 42 having an outwardly turned edge portion 44 with an external splined portion 46. The external splined portion 46 meshes with the clutch housing internal splined portion 28 so that the piston 42 is rotatable with the clutch housing 24 and movable axially relative thereto. A cup shaped cylinder 48 encloses the piston 42 and has an indented central portion 50 with a central threaded aperture 52 therethrough. The cylinder 48 has an out turned edge portion 54 which is adapted to abut the inner wall of the clutch housing beyond the internal splined portion 28. The out turned edge portion 54 has a plurality of longitudinal apertures 56 extending therethrough. An annular O-ring carrier 58 is secured to the clutch piston 42 by means of a snap ring 60 with O-rings 62 and 64 providing a seal between the clutch cylinder 48 and the clutch piston 42 and forming a chamber 66 to receive fluid therein between the rear wall 68 of the clutch piston 42 and the front wall 70 of the clutch cylinder 48. The O-ring 64, in addition to sealing the clutch piston 42 and O-ring carrier 58 as a unit within clutch cylinder 48, also serves to frictionally engage the clutch piston 42 and O-ring carrier 58 within the clutch cylinder 48 so that when the "power package" 40 is removed from the clutch, as will be described in detail at a later point in this specification, the piston 42 and O-ring carrier 58 are frictionally connected to the inner wall of cylinder 48 and are removed from the clutch housing 24 therewith.

The clutch housing internal splined portion 28 has a cut away portion 72 (FIGURES 2 and 3) adjacent the rear edge of the clutch housing 24 that forms a plurality of shoulders 74. The portions 72 are adapted to receive an annular back-up plate 76 having an external splined portion 78. The back-up plate splined portion 78 is of such a diameter that it is in meshing relation with the clutch housing splined cut away portion 72 and the front face 80 of the back-up plate 76 abuts the shoulders 74 on the clutch housing splines 28. Thus the back-up plate 76 is rotatable with the clutch housing 24 but is not movable axially with respect thereto due to the shoulders 74. The back-up plate 76 has a plurality of cup shaped indentations 82 which are axially aligned with the apertures 56 in the clutch cylinder outwardly turned flanges 54. Pin members 84 extend through the clutch cylinder apertures 56 and rest in the back-up plate cup shaped indentations 82. The pin members 56 connect the back-up plate 76 to the clutch cylinder 48 so that the clutch cylinder 48 rotates therewith. A return spring 86 is positioned within the clutch cylinder 48 and has one end portion 88 abutting the rear surface 90 of the back-up plate 76 and the other end portion 92 abutting the spring retainer member 58. A snap ring 20ª which expands outwardly into an annular groove 21ª formed in housing 24 secures the cylinder 48 to the clutch housing 24 and also maintains the cylinder flange portion 54 in abutting relation with the back-up plate 76. Thus with the above described construction, fluid pressure exerted on the clutch piston rear surface 68 moves the same axially forward and the spring retainer member 58 compresses the return spring 86 against the back-up plate 76. The exaggerated axial movement of the piston 42 with the spring 86 in its compressed position is illustrated in FIGURE 2. When the fluid pressure on the piston 42 is relieved the compression of spring 86 assures positive return of the clutch piston to its disengaged position.

The threaded aperture 52 in the clutch cylinder 48 is adapted to receive a swivel coupling which is connected to a source of fluid pressure.

With the "power package" structure above described it should be noted that the annular back-up plate 76 and the return spring 86 are adapted to be positioned within the clutch housing 24 and do not increase the external dimensions of the clutch 10. Due to the arrangement of the back-up plate 76 within the clutch housing 24, axial movement of the back-up plate 76 is limited by the shoulders 74 on the clutch housing internal splined portion 28. This limitation in axial movement of the back-up plate 76 insures positive return of the clutch piston 42 return spring 86 when fluid pressure within the chamber 66 is released. The positive return of clutch piston 42 in turn releases the friction plates 30 and 36 so that frictional wear of the plates due to partial compressive pressure thereon is reduced to a minimum.

Another important feature of our invention is the quick and easy removal of the "power package" 40 to replace the friction plates 30 and 36. All that is necessary to remove the "power package" 40 is to remove the snap ring 20ª and withdraw or axially move the "power package" 40 away from the clutch housing 24. As stated, the "power package" 40 includes both the cylinder 48 and piston 42. After removal of the "power package" 40 the various friction plates 30 and 36 may be removed from clutch 10 without further dismantling of the clutch mechanism.

Referring to FIGURE 4, there is shown a modified embodiment of the clutch structure of FIGURES 1, 2 and 3. The embodiment of FIGURE 4 is a wet disc clutch having a friction disc return spring. Insofar as the structure of FIGURE 4 is identical to that of FIGURES 1, 2 and 3, like reference numbers have been applied to FIGURE 4. Where an element appearing in FIGURE 1 has been modified in the FIGURE 4 structure, a prime suffix has been affixed to the reference number. The structure of FIGURE 4 will be described in detail only insofar as it differs from FIGURE 1; the description hereinbefore presented in connection with FIGURE 1 should be referred to for all elements of FIGURE 4 bearing reference numbers identical to FIGURE 1.

The modified transmission driven element 14' has a bearing receiving recess 100 formed therein. Recess 100 receives a bearing assembly 102 which rotatably supports the driven element 14' within transmission end wall 104. The driven element 14' also has a plurality of passages 106 formed therein for a purpose to be described.

The modified transmission driving element 12' has a longitudinally extending passage 108 formed therein which communicates with the interior of the transmission and which extends to the end of element 12' within clutch housing 24 and permits fluid communication from the interior of the transmission to the interior of clutch housing 24.

An annular bearing cover plate 110 is secured to the transmission end wall 104 surrounding the transmission driven element 14' by suitable fasteners (not shown). O-ring 112 provides a static fluid seal between the wall 104 and cover plate 110. A running fluid seal 13' seals the cover plate 110 to driven element 14'. The passages 106 in element 14' provide fluid communication from the interior of clutch housing 24 to bearing assembly 102 and the interior of the transmission while seal 13' prevents leakage of fluid to the exterior of the transmission along driven element 14'.

In order to lubricate and cool the friction plates 30 and 36 within the clutch housing 24, lubricating fluid from the interior of the transmission enters clutch housing 24 through passage 108 in driving element 12' and is circulated through the clutch housing 24. The fluid leaves clutch housing 24 through passages 106 formed in driven element 14'. The fluid then passes through bearing assembly 102 thereby lubricating bearing assembly 102, and re-enters the transmission. The lubricating fluid entering clutch housing 24 through passage 108 is at a relatively low pressure and does not interfere with the operation of the clutch by "power package" 40. The O-ring 118 is provided to seal the cylinder 48 of "power package" 40 within the housing 24 when the wet disc arrangement is utilized to prevent leakage of the lubricating fluid about the periphery of "power package" 40.

The driven element 14' has a modified outwardly flanged portion 22' to which is secured the clutch housing 24 by weld 26. The modified outwardly flanged portion 22' has an annular recess 122 formed therein. Partially disposed within recess 122 and extending axially into the interior of clutch housing 24 are a pair of Belleville springs 114 and 116 which serve as friction plate return springs. The clutch is shown in the disengaged position in FIGURE 4. The springs 114 and 116 urge the friction plates 30 and 36 axially away from flanged portion 22' and toward the "power package" 40. When the clutch is engaged, the plates 30 and 36 are forced toward the flanged portion 22' by the power package 40 as has been previously described in connection with FIGURE 1. The Belleville springs 114 and 116 are then axially compressed between the friction plates and the flanged portion 22'. When the clutch is again disengaged, the force of the Belleville springs 114 and 116 causes a positive axial movement of the friction plates 30 and 36 back toward "power package" 40. This positive movement of the friction plates insures that they do not remain stuck or wedged together to cause clutch drag after actuating fluid is vented from "power package" 40.

It will be noted that our invention provides a fluid actuated clutch wherein the worn friction discs may be easily and quickly replaced. Positive return of the clutch actuating piston is assured by the piston return spring within the "power package." The invention may be utilized as a wet disc clutch. When desirable, positive movement of the friction discs may be insured by a friction disc return spring upon disengagement of the clutch to reduce clutch drag.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a fluid operated clutch, the combination comprising a first member and a second tubular member axially positioned on said first member, said members being rotable relative to each other, said second member having a cylindrical end portion forming a housing, said housing having an annular free end portion, clutch plates positioned within said housing, alternate clutch plates being nonrotatable and axially movable relative to said housing and the intermediate clutch plates being nonrotatable and axially movable relative to said first member, said housing having an inner wall with a shoulder portion and an annular groove adjacent its free end portion, fluid operated actuator means secured to and removable from said housing as a unit, said actuator means adapted to axially move said plates relative to said housing to thereby frictionally engage said plates to each other, said actuator means including an actuating cylinder having an annular end portion, said actuator means positioned partially within said housing with said cylinder annular end portion in abutting relation with said housing shoulder portion, means nonrotatably maintaining said actuator means within said housing, and an annular ring member positioned in said housing inner wall anular groove in abutting relationship with said cylinder annular end portion thereby axially securing said actuator means in said housing and permitting removal of said actuator means as a unit from said housing upon removal of said annular ring member.

2. In a fluid operated clutch, the combination comprising a first rotatable member and a tubular second rotatable member coaxially positioned on said first rotatable member in rotatable relation thereto, said second rotatable member having an outwardly flanged end portion, a cylindrical housing secured at one end to said second rotatable member flanged portion in axial alignment with a portion of said first rotatable member extending into said housing, said housing having an inwardly extending shoulder portion adjacent its other end portion, clutch plates positioned within said housing, means nonrotatably securing alternate plates to said housing and the intermediate alternate plates to said first rotatable member for axial movement relative to said housing and said first rotatable member, fluid operated means secured to and removable as a unit from said housing and adapted to axially move said plates relative to said housing to thereby frictionally engage said plates to each other, said fluid operated means including a piston member having an annular outwardly flanged end portion, means nonrotatably securing said piston member flanged end portion to the inner wall of said housing for axial movement relative thereto, said piston flanged end portion positioned in axially spaced relation with said second rotatable member flanged end portion with said clutch plates therebetween, an annular back-up plate positioned within said housing, means nonrotatably securing said back-up plate to said housing, said back-up plate abutting said housing inwardly extending shoulder portion to thereby limit axial movement of said back-up plate relative to said housing, a cup shaped cylinder surrounding said piston and having its end portion extending into said housing, said cylinder end portion abutting said back-up plate, means nonrotatably and axially securing said cylinder to said housing, said piston having an annular spring retainer sealingly fixed to said piston and disposed in sliding relation to said cylinder, said piston and said spring retainer member forming a circular working face within said cylinder, and a single coil spring encircling said piston within said cylinder, said spring having one end portion in abutting relation with said annular back-up plate and its other end portion in abutting relation with said spring retainer member, said spring being operable to exert a force on said piston away from said clutch plates toward a clutch disengaged position.

3. In a fluid operated clutch, the combination comprising a first clutch member having a first shaft, a hub portion nonrotatably secured to said shaft, and a first plurality of annular friction plates nonrotatably and axially movably secured to said hub member, a second clutch member having a tubular shaft coaxial with and overlying said first shaft, a cylindrical housing nonrotatably fixed to said tubular shaft, and a second plurality of annular friction plates nonrotatably and axially movably secured to said cylindrical housing, said cylindrical housing being coaxial with said shafts and surrounding said friction plates, said first plurality of annular friction plates and said second plurality of annular friction plates being interleaved with each other, said housing having a portion extending axially beyond said first shaft, said hub member, and said interleaved friction plates to thereby form a recess in the end of said housing, said first and second plurality of friction plates being removable from said hub portion and said housing respectively when said plates are moved axially through said housing recess and out of said housing, a power package clutch actuator removably secured partially within said housing recess, means to nonrotatably maintain said actuator within said cylindrical housing, said clutch actuator adapted to be removed as a unit from said housing recess to expose said annular friction plates for removal from said housing through said recess, said actuator adapted to urge said annular friction plates axially into frictional engagement with each other to nonrotatably engage said first clutch member to said second clutch member when pressurized fluid is conducted to said actuator, said actuator including a cylinder and piston, said piston having a circular working face against which pressurized fluid acts, the diameter of said piston circular working face being greater than the internal diameter of said annular friction plates, said actuator piston arranged to abut said annular friction plates when said actuator has pressurized fluid conducted thereto, and a single helical spring axially encircling said piston within said cylinder to urge said piston axially away from said annular friction plates.

4. In a fluid operated clutch, the combination comprising a first member and a second tubular member axially positioned on said first member, said members being rotatable relative to each other, said second member having a radially extending flanged portion with a cylindrical housing, secured thereto, said housing having an annular free end portion, clutch plates positioned within said housing, alternate clutch plates being nonrotatable and axially movable relative to said housing and the intermediate clutch plates being nonrotatable and axially movable relative to said first member, clutch plate return spring means axially disposed between said clutch plates and said second member flanged portion to urge said clutch plates away from said flanged portion, said housing having an inner wall with a shoulder portion and an annular groove adjacent its free end portion, fluid operated actuator means removable from said fluid operated clutch as a unit, said actuator means adapted to axially move said plates relative to said housing against the force of said clutch plate return spring means to thereby frictionally engage said plates to each other, said actuator means including an actuating cylinder having an annular end portion, said actuator means positioned partially within said housing with said cylinder annular end portion in abutting relation with said housing shoulder portion, means nonrotatably securing said actuator means to said housing, and an annular ring member positioned in said housing inner wall annular groove in abutting relationship with said cylinder annular end portion thereby axially securing said actuator means in said housing and permitting removal of said actuator means as a unit from said clutch upon removal of said annular ring member.

5. In a fluid operated clutch, the combination comprising a first member and a second tubular member axially positioned on said first member, said members being rotatable relative to each other, said second member having a radially extending flanged portion with a cylindrical housing secured thereto, said housing having an annular free end portion, clutch plates positioned within said housing, alternate clutch plates being nonrotatable and axially movable relative to said housing and the intermediate clutch plates being nonrotatable and axially movable relative to said first member, clutch plate return spring means axially disposed between said clutch plates and said second member flanged portion to urge said clutch plates away from said flanged portion, said housing having an inner wall with a shoulder portion and an annular groove adjacent its free end portion, fluid operated actuator means secured to and removable from said housing as a unit, said actuator means adapted to axially move said plates toward said second member flanged portion relative to said housing against the force of said clutch plate return spring means to thereby frictionally engage said plates to each other, said actuator means including an actuating cylinder having an annular end portion, said actuator means positioned partially within said housing with said cylinder annular end portion in abutting relation with said housing shoulder portion, means nonrotatably maintaining said actuator means within said housing, and an annular ring member positioned in said housing inner wall annular groove in abutting relationship with said cylinder annular end portion thereby axially securing said actuator means in said housing and permitting removal of said actuator means as a unit from said housing upon removal of said annular ring member.

6. In a fluid operated clutch, the combination comprising a first rotatable member having a first fluid passage extending longitudinally therethrough and a tubular second rotatable member coaxially positioned upon said first rotatable member in rotatable relation thereto, said second rotatable member having an outwardly flanged end portion, a plurality of second fluid passages extending through said flanged end portion, a cylindrical housing secured at one end to said second rotatable member flanged portion in axial alignment with said flanged end portion, said first and second fluid passages communicating with the interior of said housing, said housing having an inwardly extending shoulder portion adjacent its other end portion, clutch plates positioned within said housing means nonrotatably securing alternate plates to said housing and the intermediate alternate plates to said first rotatable member for axial movement relative to said housing and said first rotatable member, cooling and lubricating fluid for said plates circulating into and out of said housing through said first and second fluid passages, fluid operated means removable as a unit from said fluid operated clutch and adapted to axially move said plates relative to said housing to thereby frictionally engage said plates to each other, said fluid operated means including a piston member having an annular outwardly flanged end portion, means nonrotatably securing said piston member flanged end portion to the inner wall of said housing for axial movement relative thereto, said piston flanged end portion positioned in axially spaced relation with said second rotatable member flanged end portion with said clutch plates therebetween, an annular back-up plate positioned within said housing, means nonrotatably securing said back-up plate to said housing, said back-up plate abutting said housing inwardly extending shoulder portion to thereby limit axial movement of said back-up plate relative to said housing, a cup shaped cylinder surrounding said piston and having its end portion extending into said housing, said cylinder end portion abutting said back-up plate, means nonrotatably and axially securing said cylinder to said housing, said piston having an annular spring retainer member sealingly fixed to said piston and disposed in sliding relation to said cylinder, said piston and said spring retainer member forming a circular working face within said cylinder, and a single coil spring encircling said piston within said cylinder, said spring having one end portion in abutting relation with said annular back-up plate and its other end portion in abutting relation with said spring retainer member, said spring being operable to exert a force on said piston away from said clutch plates toward a clutch disengaged position.

7. In a fluid operated clutch operable to engage two relatively rotatable members within a fixed casing, said clutch disposed exteriorly of said casing and rotatably supported within said casing wall by a bearing assembly, the combination comprising a first clutch member having a first shaft with a longitudinally extending first fluid passage formed therein, a hub portion nonrotatably secured to said shaft, and a first plurality of annular friction plates nonrotatably and axially movably secured to said hub member, a second clutch member having a tubular shaft with a radially extending flange portion having a plurality of second fluid passages formed therein coaxial with and overlying said first shaft, a cylindrical housing nonrotatably fixed to said tubular shaft flange portion, and a second plurality of annular friction plates nonrotatably and axially movably secured to said cylindrical housing, said first plurality of annular friction plates and said second plurality of annular friction plates being interleaved with each other, an annular friction plate return spring axially disposed between said friction plates and said tubular shaft flange portion to urge said friction plates away from said flange portion, said housing having a portion extending axially beyond said first shaft, said hub member, and said interleaved friction plates to thereby form a recess in the end of said housing, said first and second plurality of friction plates being removable from said hub portion and said housing respectively when said plates are moved axially through said housing recess and out of said housing, a power package clutch actuator removably secured partially within said housing recess, means to nonrotatably maintain said actuator within said cylindrical housing, said clutch actuator adapted to be removed as a unit from said housing recess to expose said annular friction plates for removal from said housing through said recess, said actuator adapted to urge said annular friction plates axially into frictional engagement with each other against the force of said friction plate return spring means and toward said tubular shaft flange portion to nonrotatably engage said first clutch member to said second clutch member when pressurized fluid is conducted to said actuator, said actuator including a cylinder and piston having a circular working face against which pressurized fluid acts, the diameter of said piston circular working face being greater than the internal diameter of said annular friction plates, said actuator piston arranged to abut said annular friction plates when said actuator has pressurized fluid conducted thereto, and a single helical spring axially encircling said piston within said cylinder to urge said piston axially away from said annular friction plates.

8. In a fluid operated clutch disposed exteriorly of an enclosed casing and rotatable relative to said casing, the combination comprising a first member having a longitudinal first fluid passage formed therein extending through the wall of said casing and rotatable relative thereto, a second tubular member coaxially positioned in rotatable relation to said first member and rotatably supported within said casing wall by a bearing assembly, an annular bearing cover plate sealingly fixed to said casing wall adjacent said bearing assembly and coaxially surrounding said tubular member, a running fluid seal sealingly connecting said tubular member and said bearing cover plate to prevent leakage of fluid therebetween, said tubular member having a radially extending flanged portion exteriorly of said bearing cover plate, a cylindrical housing fixed to said flanged portion and extending in coaxial relation to said tubular member, a plurality of second fluid passages extending through said second tubular member to permit fluid communication of the interior of said cylindrical housing with said bearing assembly, said first member first fluid passage permitting fluid communication of said housing interior with the interior of said enclosed casing clutch plates positioned within said housing, alternate clutch plates being nonrotatably and axially movable relative to said housing and the intermediate clutch plates being nonrotatable and axially movable relative to said first member, an annular clutch plate return spring positioned within said housing axially between said clutch plates and said tubular member flanged portion and urging said clutch plates away from said flanged portion, said housing having a free end portion, said housing having an inner wall with an inwardly extending shoulder portion and an annular groove adjacent its free end portion, fluid operated actuator means secured to and removable from said housing as a unit adapted to axially move said plates relative to said housing against the force of said clutch plate return spring to thereby frictionally engage said plates to each other, lubricating and cooling fluid for said clutch plates circulated from within said enclosed casing, through said first fluid passage, among said clutch plates, through said plurality of second fluid passages, through said bearing assembly, and into said enclosed casing, said clutch plate return spring adapted to positively move said clutch plates away from said flanged portion when said clutch plates are not frictionally engaged to each other by said actuator means, said actuator means including an annular back-up plate and an actuating cylinder having an annular end portion, said cylinder annular end portion positioned in abutting relatio with said back-up plate, means nonrotatably maintaining said cylinder relative to said housing, and an annular ring member positioned in said housing inner wall annular groove, said annular ring member abutting said cylinder annular end portion and thereby securing said actuator means in said housing and permitting removal of said actuator means as a unit from said housing upon removal of said annular ring member.

References Cited in the file of this patent

UNITED STATES PATENTS

| | | |
|---|---|---|
| 2,403,579 | Carpenter | July 9, 1946 |
| 2,583,556 | Fleischel | Jan. 29, 1952 |
| 2,880,834 | Gerst | Apr. 7, 1959 |
| 2,880,835 | Hass | Apr. 7, 1959 |